United States Patent
Katsuragi et al.

(10) Patent No.: US 10,132,361 B2
(45) Date of Patent: Nov. 20, 2018

(54) METHOD FOR MANUFACTURING PROPELLER SHAFT

(71) Applicant: Hino Motors, Ltd., Hino-shi (JP)

(72) Inventors: Masaki Katsuragi, Hino (JP); Tomonori Kato, Hino (JP); Shingo Sugamata, Hino (JP); Satoshi Shibata, Hino (JP)

(73) Assignee: Hino Motors, Ltd., Hino-shi (JP)

( * ) Notice: Subject to any disclaimer, the term of this patent is extended or adjusted under 35 U.S.C. 154(b) by 106 days.

(21) Appl. No.: 14/424,640

(22) PCT Filed: Jun. 12, 2013

(86) PCT No.: PCT/JP2013/066265
§ 371 (c)(1),
(2) Date: Feb. 27, 2015

(87) PCT Pub. No.: WO2014/034225
PCT Pub. Date: Mar. 6, 2014

(65) Prior Publication Data
US 2015/0226269 A1     Aug. 13, 2015

(30) Foreign Application Priority Data
Aug. 31, 2012 (JP) .................. 2012-191673

(51) Int. Cl.
*F16D 1/068* (2006.01)
*F16D 3/38* (2006.01)
(Continued)

(52) U.S. Cl.
CPC .............. *F16D 3/387* (2013.01); *B23K 11/34* (2013.01); *F16D 1/068* (2013.01); *F16D 1/0858* (2013.01); *F16D 3/16* (2013.01); *Y10T 29/49908* (2015.01)

(58) Field of Classification Search
CPC ... Y10T 29/49908; F16D 3/387; F16D 1/068; F16D 1/0858; B23K 11/34
See application file for complete search history.

(56) References Cited

U.S. PATENT DOCUMENTS

| 4,542,280 A | 9/1985 | Simons |
| 5,330,095 A | 7/1994 | Krude et al. |

(Continued)

FOREIGN PATENT DOCUMENTS

| CN | 101116925 A | 2/2008 |
| CN | 201739369 U | 2/2011 |

(Continued)

OTHER PUBLICATIONS

JP2008055506A, Mar. 13, 2008, English translation.*
(Continued)

*Primary Examiner* — Sarang Afzali
*Assistant Examiner* — Ruth G Hidalgo-Hernandez
(74) *Attorney, Agent, or Firm* — Oblon, McClelland, Maier & Neustadt, L.L.P.

(57) ABSTRACT

A method for manufacturing a propeller shaft comprising: a shaft portion of a circular tube shape; and a joint assembly to be joined to a transfer gear box side or a differential gear box side of the shaft portion, the joint assembly comprising a shaft-side joint to be joined to the shaft portion and an other-member-side joint to be coupled to a transfer gear box or to a differential gear box, the method having: a press fitting step of pressing the shaft-side joint of the joint assembly into the shaft portion, in a state in which the shaft-side joint and the other-member-side joint have been assembled into the joint assembly; and a welding step of welding the shaft portion and the joint assembly, after the press fitting step.

9 Claims, 11 Drawing Sheets

(51) Int. Cl.
  *F16D 3/16* (2006.01)
  *F16D 1/08* (2006.01)
  *B23K 11/34* (2006.01)

(56) References Cited

U.S. PATENT DOCUMENTS

| | | | |
|---|---|---|---|
| 5,672,286 A | 9/1997 | Seeds | |
| 5,952,109 A * | 9/1999 | Nagami | B23K 33/00 |
| | | | 428/599 |
| 2003/0224863 A1 | 12/2003 | Simboli | |
| 2009/0208279 A1 | 8/2009 | Cermak | |

FOREIGN PATENT DOCUMENTS

| | | |
|---|---|---|
| CN | 102094891 A | 6/2011 |
| CN | 202138227 U | 2/2012 |
| EP | 1 350 975 A2 | 10/2003 |
| JP | 53-31546 A | 3/1978 |
| JP | S 53-149839 A | 12/1978 |
| JP | S58-029191 | 6/1983 |
| JP | 60-174263 A | 9/1985 |
| JP | H2-087115 | 7/1990 |
| JP | 06-63754 | 3/1994 |
| JP | H 7-019234 A | 1/1995 |
| JP | 8-10951 A | 1/1996 |
| JP | 8-177842 A | 7/1996 |
| JP | 9-174238 A | 7/1997 |
| JP | 11-77299 A | 3/1999 |
| JP | 11-151621 A | 6/1999 |
| JP | 2004-144269 A | 5/2004 |
| JP | 2005-053472 A | 3/2005 |
| JP | 2005-214371 A | 8/2005 |
| JP | 2008-055506 A | 3/2008 |
| JP | 2008-151153 A | 7/2008 |
| JP | 2008-232189 A | 10/2008 |

OTHER PUBLICATIONS

Combined Chinese Office Action and Search Report dated Jul. 21, 2016 in Patent Application No. 201380042507.7 (with English translation of categories of cited documents).
Extended European Search Report dated Mar. 11, 2016 in Patent Application 13832067.6.
Office Action dated Apr. 26, 2016 and issued to JP2012-191673.
International Preliminary Report on Patentability and Written Opinion dated Mar. 12, 2015 in PCT/JP2013/066265 (English translation only).
International Search Report dated Sep. 10, 2013 in PCT/JP2013/066265 Filed Jun. 12, 2013.
Office Action dated Mar. 6, 2018 in corresponding Japanese Patent Application No. 2017-074653, 2 pages.

* cited by examiner

METHOD FOR MANUFACTURING PROPELLER SHAFT

TECHNICAL FIELD

The present invention relates to a method for manufacturing a propeller shaft, and a propeller shaft manufactured by this method.

BACKGROUND ART

In general, a propeller shaft is provided with a shaft portion of a circular tube shape extending in the longitudinal direction of vehicle, a first other-member-side joint (universal joint) to be coupled to the transfer gear box, a first shaft-side joint to couple the shaft portion to the first other-member-side joint, a second other-member-side joint to be coupled to the differential gear box, and a second shaft-side joint to couple the shaft portion to the second other-member-side joint (e.g., cf. Patent Literature 1).

In manufacturing the propeller shaft of this type, first, the first shaft-side joint and the second shaft-side joint are pressed into both ends of the shaft portion and, the first shaft-side joint and the second shaft-side joint are welded to the shaft portion by full-circled welding. Then, after strain is removed from the shaft portion, the first shaft-side joint, and the second shaft-side joint, the first other-member-side joint is attached to the first shaft-side joint and the second other-member-side joint is attached to the second shaft-side joint.

CITATION LIST

Patent Literature

Patent Literature 1: Japanese Patent Application Laid-open Publication No. 2005-053472

SUMMARY OF INVENTION

Technical Problem

In the conventional manufacturing method of the propeller shaft, however, the number of man-hours is large and thus there is room for improvement in terms of reduction in the number of man-hours.

Therefore, one aspect of the present invention has an object to provide a method for manufacturing a propeller shaft, which allows reduction in the number of man-hours, and a propeller shaft manufactured by this method.

Solution to Problem

A manufacturing method of a propeller shaft according to one aspect of the present invention is a method for manufacturing a propeller shaft comprising: a shaft portion of a circular tube shape; and a joint assembly to be joined to a transfer gear box side or a differential gear box side of the shaft portion, the joint assembly comprising a shaft-side joint to be joined to the shaft portion and an other-member-side joint to be coupled to a transfer gear box or to a differential gear box, the method having: a press fitting step of pressing the shaft-side joint of the joint assembly into the shaft portion, in a state in which the shaft-side joint and the other-member-side joint have been assembled into the joint assembly; and a welding step of welding the joint assembly and the shaft portion, after the press fitting step.

In the manufacturing method of the propeller shaft according to one aspect of the present invention, the shaft-side joint is pressed into the shaft portion after the shaft-side joint and the other-member-side joint have been assembled, whereby the shaft-side joint and the other-member-side joint can be attached to the shaft portion in one step. This allows reduction in the number of man-hours.

Furthermore, the welding step can comprise: forming a molten portion in a groove of the shaft portion and the joint assembly by arc generated with application of current to an electrode, and supplying a following wire without application of current, to the molten portion, before the molten portion hardens.

In this case, the following wire can be supplied to a swelling portion of the molten portion in a rear part in a travel direction of the arc.

Furthermore, in the welding step the groove can be made as a narrow groove in a substantially U-shaped cross section with opposed faces being substantially parallel.

A propeller shaft according to one aspect of the present invention is one manufactured by the manufacturing method as described in any one of the above.

Advantageous Effect of Invention

According to one aspect of the present invention, it is feasible to provide the method for manufacturing the propeller shaft, which allows reduction in the number of man-hours, and the propeller shaft manufactured by this method.

DESCRIPTION OF EMBODIMENTS

Preferred embodiments of the present invention will be described below in detail with reference to the drawings. Identical or equivalent elements will be denoted by the same reference signs in the description hereinbelow, without redundant description.

First, a structure of a propeller shaft according to an embodiment of the present invention will be described.

Figure 1:
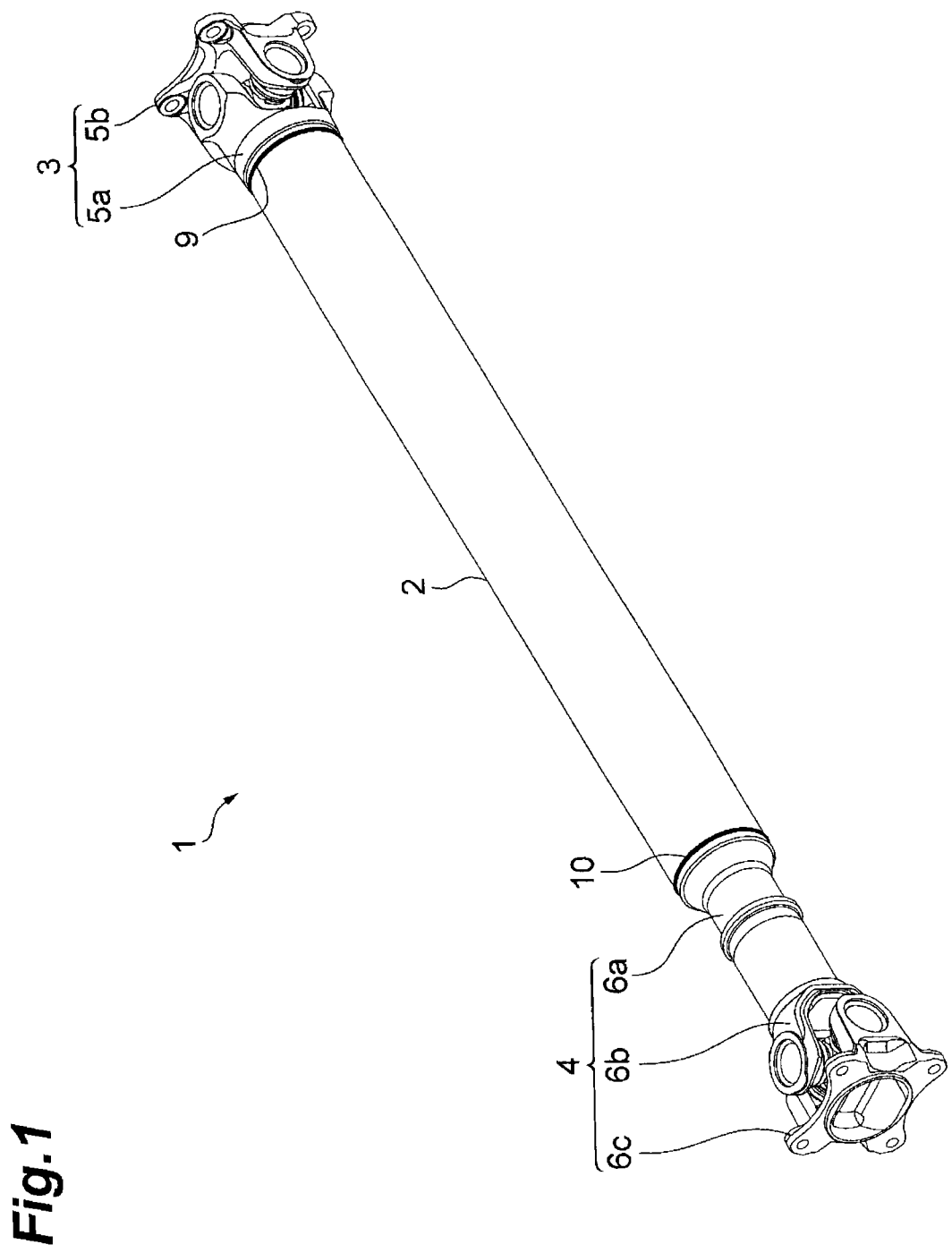
FIG. 1 is a perspective view showing a propeller shaft according to an embodiment of the present invention.

As shown in FIG. 1, the propeller shaft 1 is provided with a shaft portion 2 of a circular tube shape extending in the longitudinal direction of vehicle between the transfer gear box (not shown) and the differential gear box (not shown), a transfer-gear-box-side joint assembly 3 to be joined to a transfer gear box side of the shaft portion 2, and a differential-gear-box-side joint assembly 4 to be joined to a differential gear box side of the shaft portion 2.

Next, a method for manufacturing the propeller shaft 1 will be described.

Figure 2:
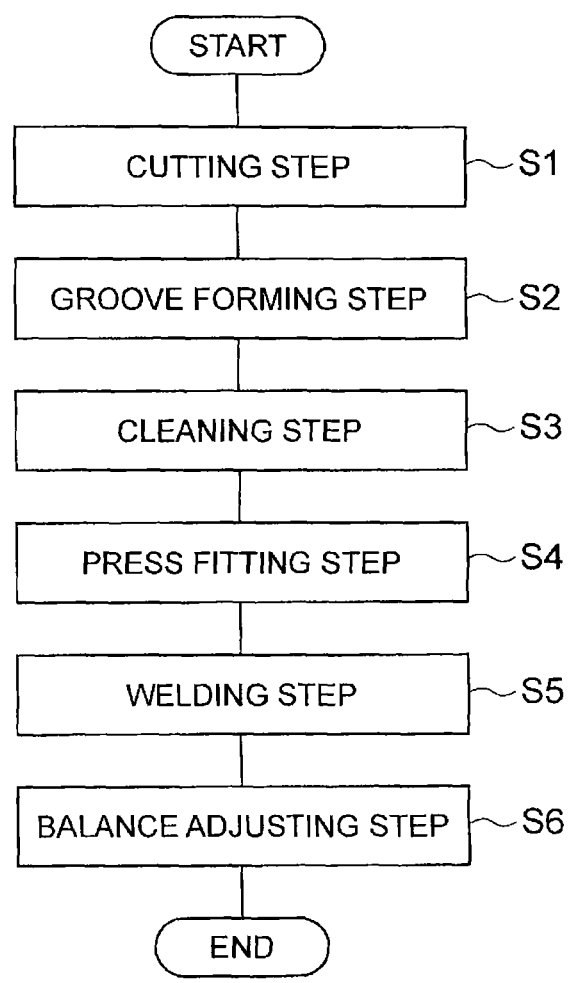
FIG. 2 is a flowchart showing a method for manufacturing the propeller shaft according to the embodiment of the present invention.

As shown in FIG. 2, the method for manufacturing the propeller shaft 1 includes a cutting step (step S1), a groove forming step (step S2), a cleaning step (step S3), a press fitting step (step S4), a welding step (step S5), and a balance adjusting step (step S6), which are carried out in this order.

In the cutting step of step S1, a circular tube of steel extending linearly is cut to form the shaft portion 2 of the circular tube shape.

Figure 3:
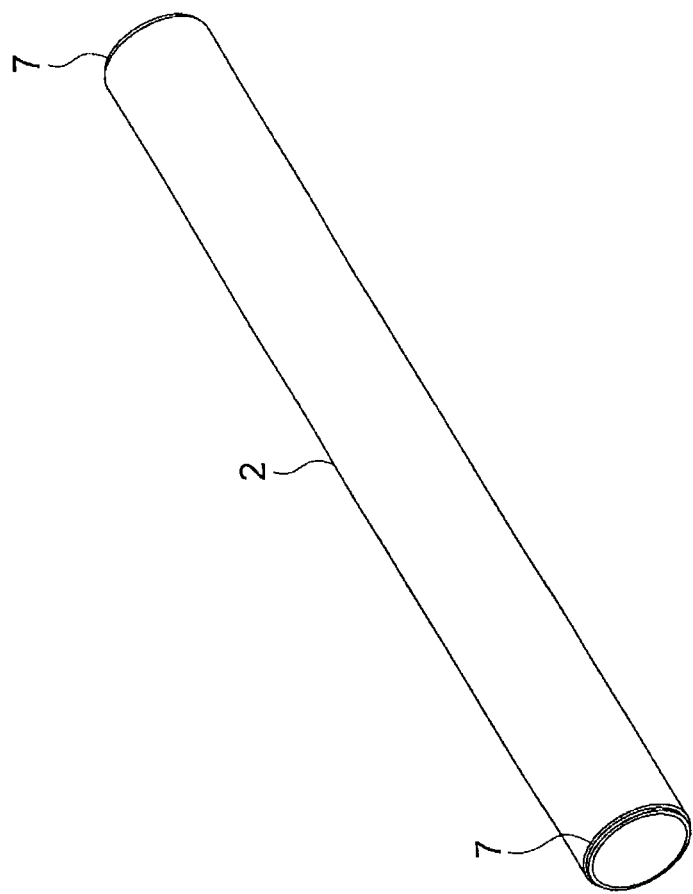
FIG. 3 is a perspective view for explaining a groove forming step.

In the groove forming step of step S2, as shown in FIG. 3, reduced-diameter portions 7 with the outer periphery reduced are formed at both ends of the shaft portion 2 formed in step S1. The reduced-diameter portions 7 are formed in an L-shaped cross section and each of them is formed of a face extending in directions perpendicular to the extending direction of the shaft portion 2 from the outer peripheral surface of the shaft portion 2, and a face extending in the extending direction of the shaft portion 2 from the end face of the shaft portion 2. The reduced-diameter portions 7 are provided for a process of pressing the transfer-gear-box-side joint assembly 3 and the differential-gear-box-side joint assembly 4 into the shaft portion 2 in the press fitting step of step S4, and in that process they form narrow grooves 8 of a gap shape in a nearly U-shaped cross section with opposed faces being nearly parallel, between the shaft portion 2 and the transfer-gear-box-side joint assembly 3 and between the shaft portion 2 and the differential-gear-box-side joint assembly 4.

In the cleaning step of step S3, the shaft portion 2 with the reduced-diameter portions 7 thus formed is cleaned.

Figure 4:
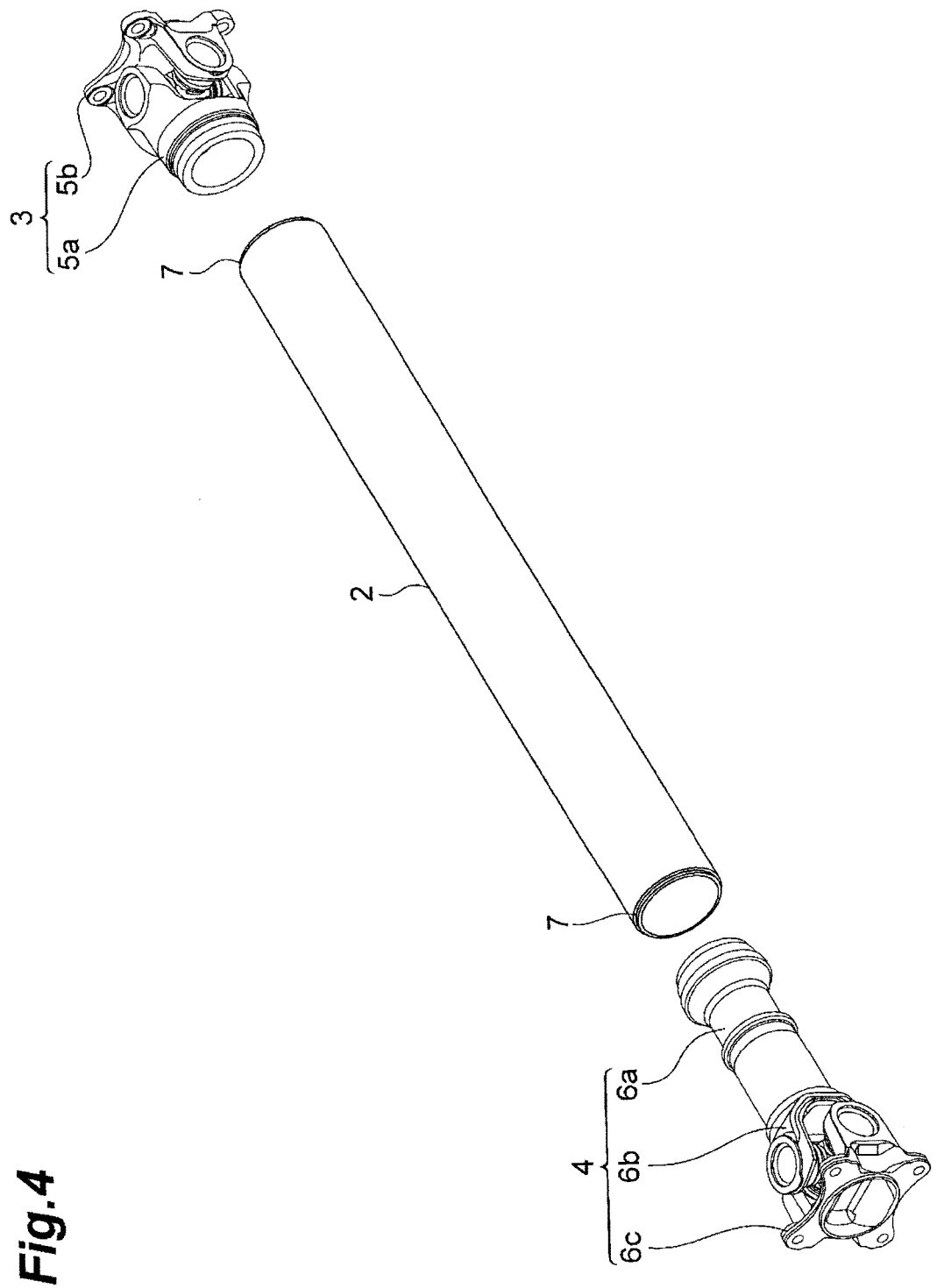
FIG. 4 is a perspective view for explaining a press fitting step.
Figure 5:
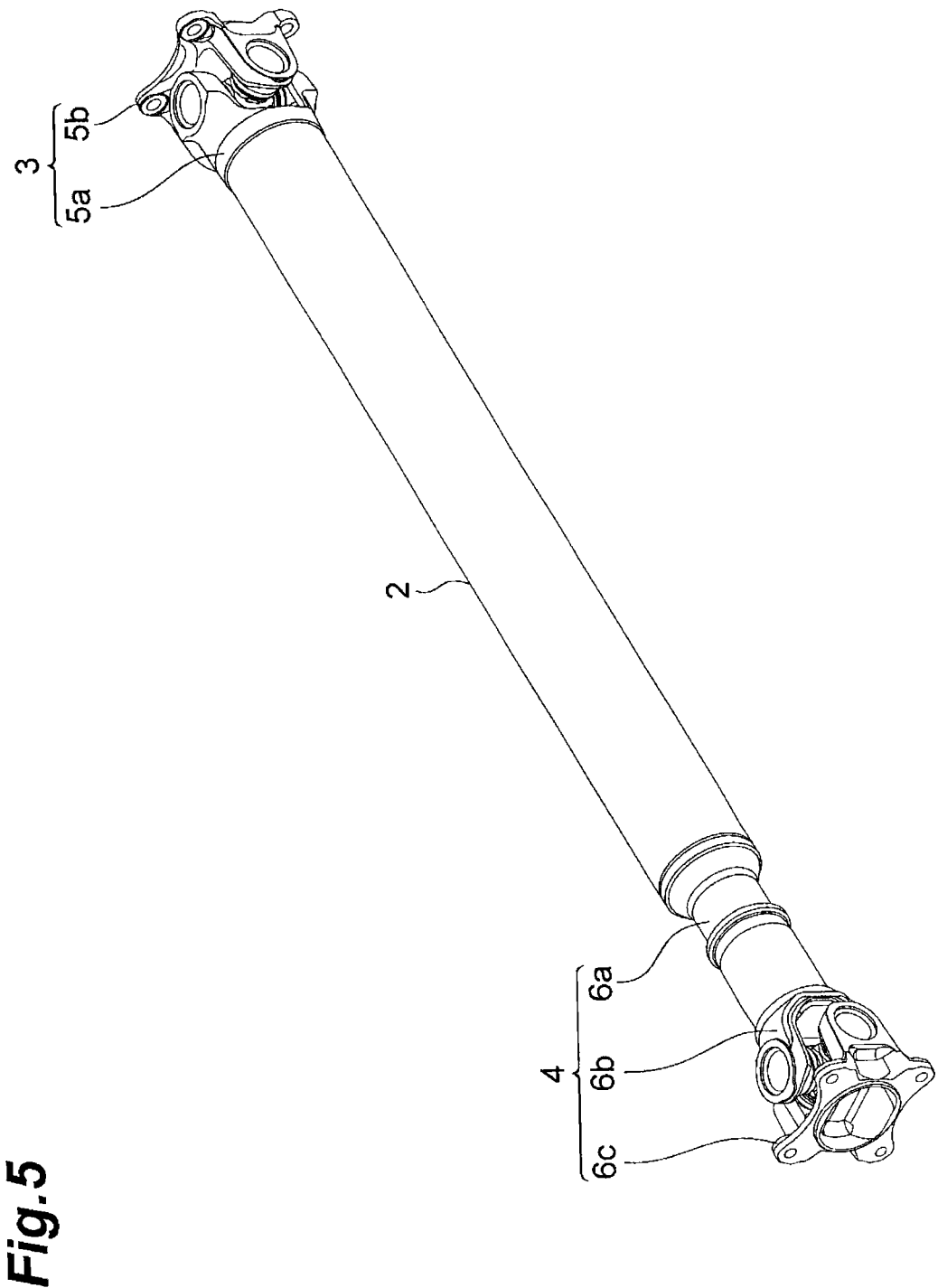
FIG. 5 is a perspective view for explaining the press fitting step.

In the press fitting step of step S4, as shown in FIGS. 4 and 5, the transfer-gear-box-side joint assembly 3 and the differential-gear-box-side joint assembly 4 are pressed each into the inner peripheral surface at both ends of the shaft portion 2.

Structures of the transfer-gear-box-side joint assembly 3 and the differential-gear-box-side joint assembly 4 will be described below in detail with reference to FIGS. 6 and 7.

Figure 6:
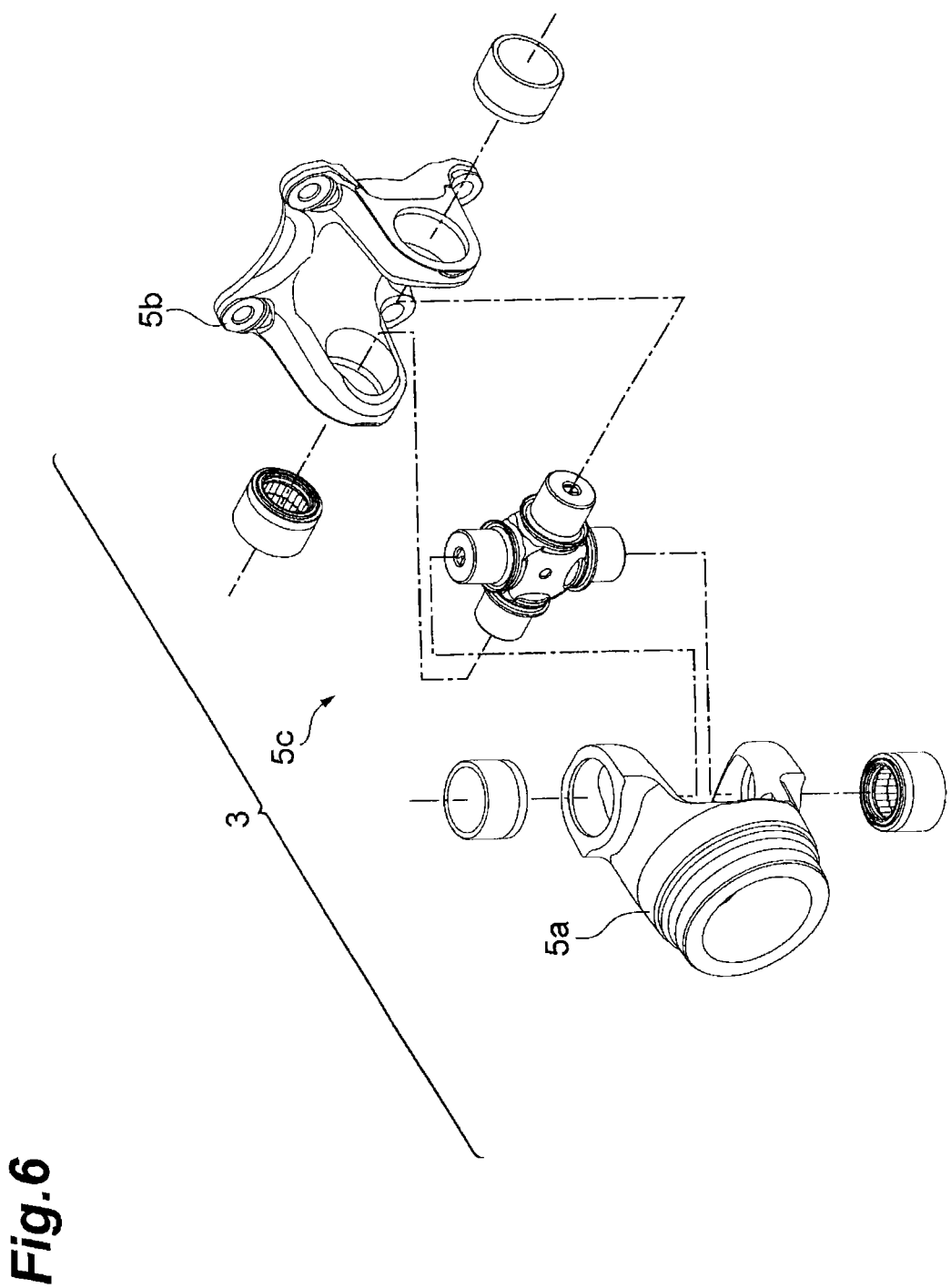
FIG. 6 is an exploded perspective view of a transfer-gear-box-side joint assembly.

As shown in FIG. 6, the transfer-gear-box-side joint assembly 3 is provided with a shaft-side joint 5a to be joined to the shaft portion 2, an other-member-side joint 5b to be coupled to the transfer gear box, and a coupling member 5c to couple the shaft-side joint 5a to the other-member-side joint 5b in a freely-inclinable state. Namely, the transfer-gear-box-side joint assembly 3 is configured so that the shaft-side joint 5a and the other-member-side joint 5b are coupled to each other through the coupling member 5c whereby the other-member-side joint 5b is freely inclinable relative to the shaft-side joint 5a. For this reason, the transfer-gear-box-side joint assembly 3 functions a free joint (universal joint). Before execution of the press fitting step of step S4, the transfer-gear-box-side joint assembly 3 is assembled (assembling step), and in the press fitting step of step S4, the shaft-side joint 5a of the transfer-gear-box-side joint assembly 3 is pressed into the shaft portion 2. Namely, the press fitting step of step S4 is carried out after the assembling step of assembling the shaft-side joint 5a, the other-member-side joint 5b, and the coupling member 5c into the transfer-gear-box-side joint assembly 3.

Figure 7:
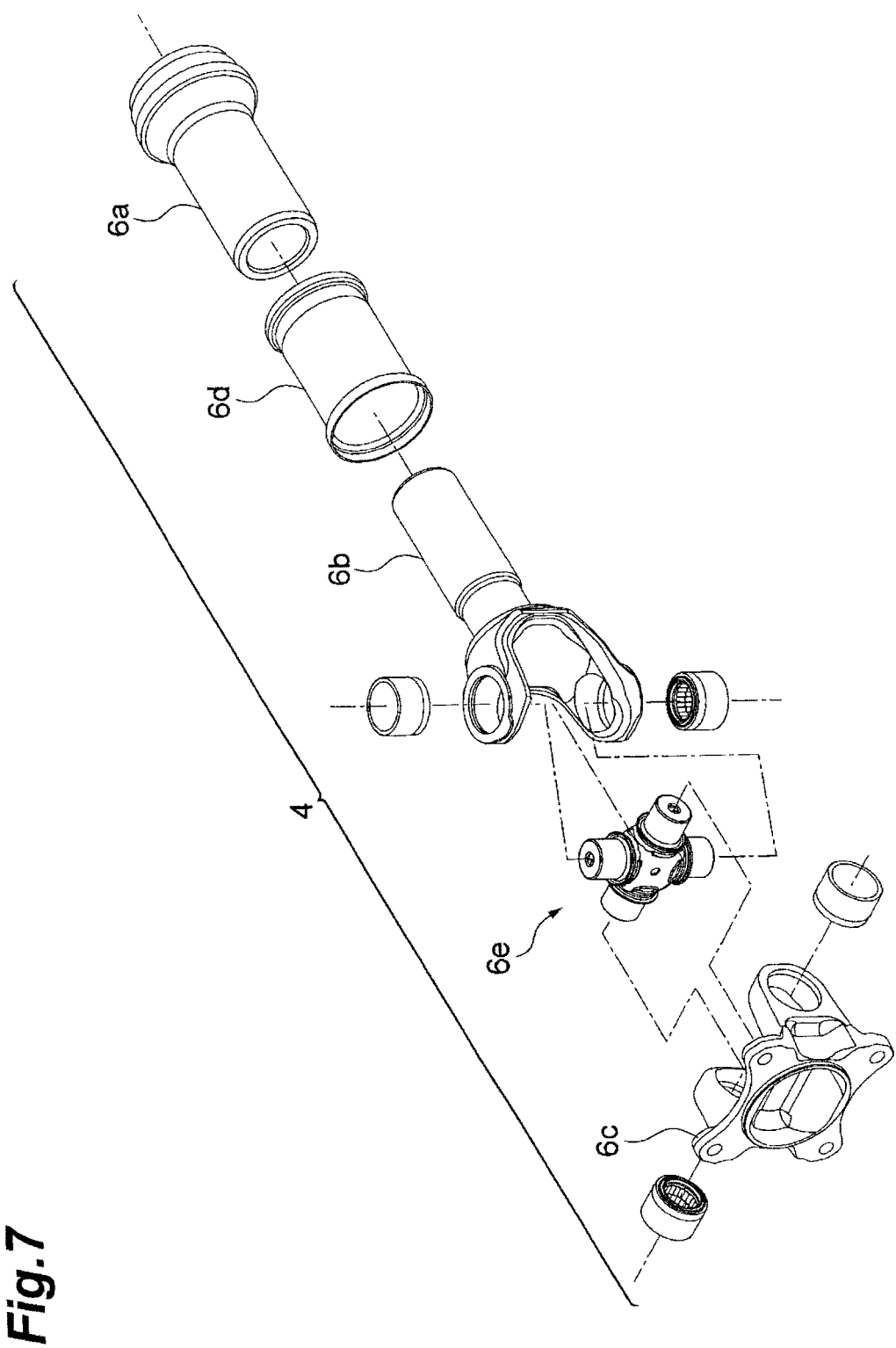
FIG. 7 is an exploded perspective view of a differential-gear-box-side joint assembly.

As shown in FIG. 7, the differential-gear-box-side joint assembly 4 is provided with an extension tube 6a of a circular tube shape with the diameter smaller than that of the shaft portion 2, which is to be joined to the shaft portion 2, a shaft-side joint 6b to be joined to the extension tube 6a, an other-member-side joint 6c to be coupled to the differential gear box, a coupling member 6d of a circular tube shape to couple the extension tube 6a and the shaft-side joint 6b to each other, and a coupling member 6e to couple the shaft-side joint 6b to the other-member-side joint 6c in a freely inclinable state. Namely, the differential-gear-box-side joint assembly 4 is configured so that the extension tube 6a and the shaft-side joint 6b are coupled to each other through the coupling member 6d, whereby it functions as a shaft-side joint to be joined to the shaft portion 2 and achieves extension and diameter reduction of the shaft portion 2. Furthermore, the differential-gear-box-side joint assembly 4 is configured so that the shaft-side joint 6b and the other-member-side joint 6c are coupled to each other through the coupling member 6e, whereby the other-member-side joint 6c is freely inclinable relative to the shaft-side joint 6b. For this reason, the differential-gear-box-side joint assembly 4 functions as a free joint. Before execution of the press fitting step of step S4, the differential-gear-box-side joint assembly 4 is assembled (assembling step), and in the press fitting step of step S4, the extension tube 6a of the differential-gear-box-side joint assembly 4 is pressed into the shaft portion 2. Namely, the press fitting step of step S4 is carried out after the assembling step of assembling the extension tube 6a, the shaft-side joint 6b, the other-member-side joint 6c, the coupling member 6d, and the coupling member 6e into the differential-gear-box-side joint assembly 4.

Figure 8:
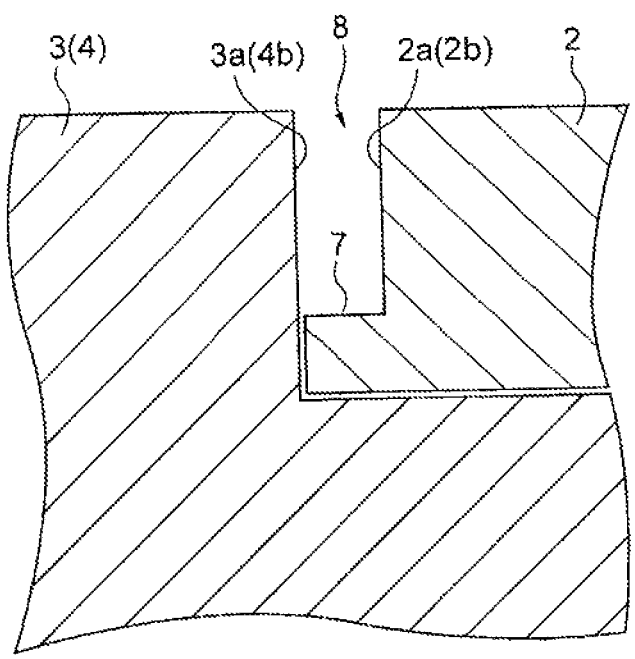
FIG. 8 is a cross-sectional view showing a groove shape of narrow grooves.

In this manner, the shaft-side joint 5a of the transfer-gear-box-side joint assembly 3 and the extension tube 6a of the differential-gear-box-side joint assembly 4 are pressed into the inner peripheral surface at both ends of the shaft portion 2, whereby, as shown in FIG. 8, the narrow grooves 8 of the gap shape in the nearly U-shaped cross section with the opposed faces being nearly parallel are formed between the shaft portion 2 and the transfer-gear-box-side joint assembly 3 and between the shaft portion 2 and the differential-gear-box-side joint assembly 4. The formation of the narrow grooves 8 can be implemented by forming the reduced-diameter portions 7 at both ends of the shaft portion 2 in the aforementioned groove forming step of step S2, but it may be implemented by forming grooves at the ends of the transfer-gear-box-side joint assembly 3 and the differential-gear-box-side joint assembly 4.

The narrow groove 8 between the shaft portion 2 and the transfer-gear-box-side joint assembly 3 is defined by a shaft potion opposed face 2a of the shaft portion 2 opposed to the transfer-gear-box-side joint assembly 3 and a transfer-gear-box-side joint assembly opposed face 3a of the transfer-gear-box-side joint assembly 3 opposed to the shaft portion 2. The shaft portion opposed face 2a and the transfer-gear-box-side joint assembly opposed face 3a are approximately parallel. The narrow groove 8 between the shaft portion 2 and the differential-gear-box-side joint assembly 4 is defined by a shaft potion opposed face 2b of the shaft portion 2 opposed to the differential-gear-box-side joint assembly 4 and a differential-gear-box-side joint assembly opposed face 4b of the differential-gear-box-side joint assembly 4 opposed to the shaft portion 2. The shaft portion opposed face 2b and the differential-gear-box-side joint assembly opposed face 4b are approximately parallel. It is noted that there are no particular restrictions on the shape of the bottom faces of the narrow grooves 8 and the shape may be planar or curved.

In the welding step of step S5, as shown in FIG. 1, the transfer-gear-box-side joint assembly 3 and the differential-gear-box-side joint assembly 4 are welded to the shaft portion 2 by full-circled welding.

The below will detail the full-circled welding of the transfer-gear-box-side joint assembly 3 and the differential-gear-box-side joint assembly 4 to the shaft portion 2, with reference to FIGS. 8 and 9.

As described above, the narrow grooves 8 are formed at locations where the shaft portion 2 is joined to the transfer-gear-box-side joint assembly 3 and to the differential-gear-box-side joint assembly 4 (cf. FIG. 8).

Then, along the narrow grooves 8, the shaft portion 2 is arc-welded to the transfer-gear-box-side joint assembly 3 and to the differential-gear-box-side joint assembly 4. This arc welding is carried out by cold tandem welding. The cold tandem welding is a welding method using two wires, a preceding welding wire and a following filler wire, and it is a welding method of forming a molten portion in a groove by arc generated with application of current to the preceding welding wire, and, before this molten portion hardens, supplying the following filler wire without application of current, to the molten portion.

Figure 9:
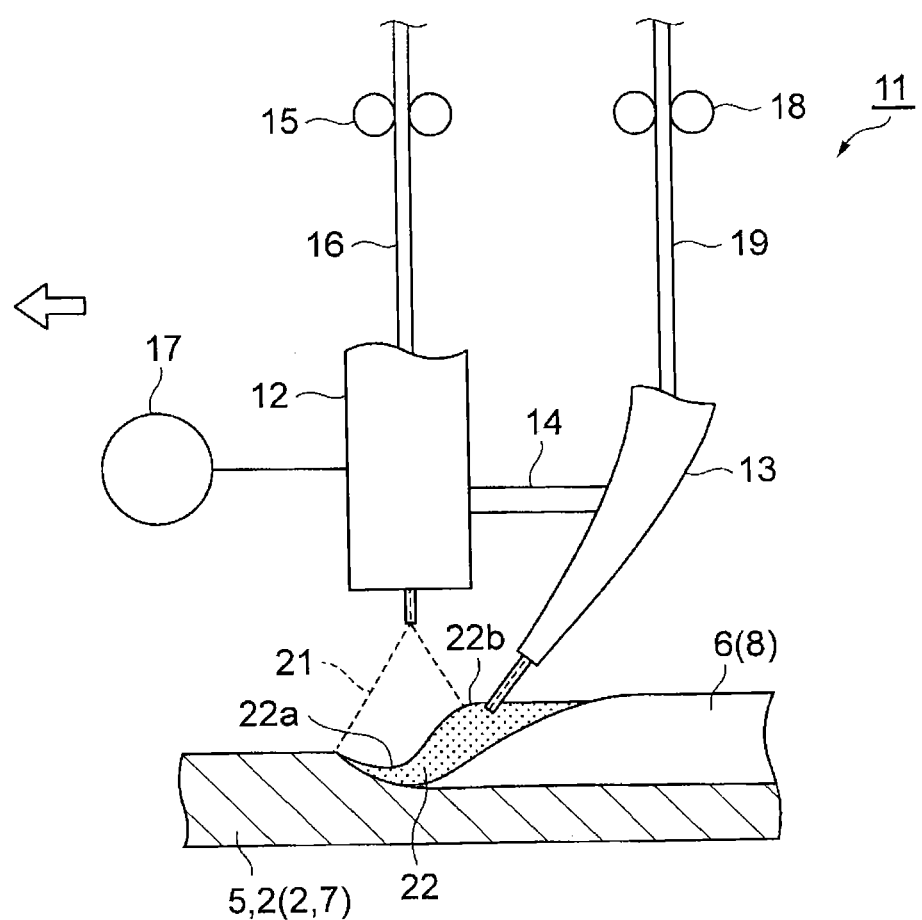
FIG. 9 is a drawing for explaining a welding method in a welding step.

As shown in FIG. 9, a welding device 11 for carrying out the cold tandem welding is provided with an arc welding torch 12, a filler wire supply device 13, and a coupling member 14.

The arc welding torch 12 is a device for performing arc welding. This arc welding torch 12 feeds a welding wire 16 as consumable electrode fed out of a first wire feed device 15, to a welding position of base metal. Furthermore, the arc welding torch 12 applies welding current supplied from a power supply device 17, to the welding wire 16 to generate arc between this welding wire 16 and the base metal. The welding wire 16 to be used herein can be, for example, a solid wire compliant with JIS Z3312 YGW12.

The filler wire supply device 13 is a device for feeding the filler wire 19 fed out of a second wire feed device 18, without application of current, to a position close to the welding position of base metal. The filler wire 19 to be used herein can be, for example, a solid wire compliant with JIS Z3312 YGW12.

The coupling member 14 is a device that couples the arc welding torch 12 and the filler wire supply device 13 to each other, while maintaining the spacing between the arc welding torch 12 and the filler wire supply device 13 so as to keep the welding position with the welding wire 16 and the position where the filler wire 19 is fed out, at a predetermined distance. The coupling member 14 may couple the arc welding torch 12 and the filler wire supply device 13 to each other in a detachable manner or may couple the arc welding torch 12 and the filler wire supply device 13 to each other in a fixed manner. Furthermore, the coupling member 14 may set the spacing between the arc welding torch 12 and the filler wire supply device 13 so as to be fixed or may set the spacing between the arc welding torch 12 and the filler wire supply device 13 so as to be variable.

In the welding device 11 configured as described above, while the arc welding torch 12 and the filler wire supply device 13 coupled to the coupling member 14 are moved relative to the base metal, the filler wire supply device 13 is located behind the arc welding torch 12 in the direction of the movement. For this reason, the position where the filler wire 19 is fed out is located behind the welding position with the welding wire 16, in the movement direction. In the present embodiment, the direction in which the arc welding torch 12 and the filler wire supply device 13 move relative to the base metal will be referred to as "travel direction."

In the cold tandem welding, the arc welding torch 12 and the filler wire supply device 13 are moved relative to the shaft portion 2, the transfer-gear-box-side joint assembly 3, and the differential-gear-box-side joint assembly 4 as base metal, along the narrow grooves 8. Then, the arc welding torch 12 moves ahead the filler wire supply device 13 and the filler wire supply device 13 moves following the arc welding torch.

At this time, the arc welding torch 12 preceding the filler wire supply device 13 operates to apply the welding current to the welding wire 16 to generate arc 21 between the welding wire 16 and the narrow groove 8. Then, a molten portion 22 resulting from melting of the welding wire 16, the shaft portion 2, and the shaft-side joint 5a of the transfer-gear-box-side joint assembly 3 is made in the narrow groove 8 between the shaft portion 2 and the transfer-gear-box-side joint assembly 3. Similarly, a molten portion 22 resulting from melting of the welding wire 16, the shaft portion 2, and the extension tube 6a of the differential-gear-box-side joint assembly 4 is made in the narrow groove 8 between the shaft portion 2 and the differential-gear-box-side joint assembly 4.

The molten portion 22 consists of a molten pool. This molten portion 22 is depressed under pressure (arc power) from the arc 21, below the arc 21 and the portion depressed most by the arc power becomes a bottom 22a of the molten portion 22. The molten portion 22 gradually rises to swell as influence of the arc power becomes weaker with distance from the bottom 22a. For this reason, a swelling portion 22b resulting from swelling of the molten portion 22 is formed in the rear part in the travel direction of the bottom 22a. The swelling portion 22b is a portion consisting of molten metal before hardening (solidifying). Then, the swelling portion 22b becomes cooled to harden (solidify), thereby to form excess weld metal 9 at the joining location between the shaft portion 2 and the transfer-gear-box-side joint assembly 3 or to form excess weld metal 10 at the joining location between the shaft portion 2 and the differential-gear-box-side joint assembly 4. The excess weld metal 9 and the excess weld metal 10 are also called beads.

On the other hand, the filler wire supply device 13 following the arc welding torch 12 supplies the filler wire 19 without application of current, to the swelling portion 22b of the molten portion 22. The position of supply of the filler wire 19 is adjusted, for example, by adjusting the spacing between the arc welding torch 12 and the filler wire supply device 13 by the coupling member 14, by adjusting the orientation of the filler wire supply device 13, or the like.

As the filler wire 19 is supplied to the swelling portion of the molten portion 22, the filler wire 19 is melted by heat of the molten portion to replenish the molten portion 22 with molten metal. This results in forming good excess weld metal 9 and excess weld metal 10.

Since the filler wire 19 without application of current is not heated, the supply of the filler wire 19 to the swelling portion 22b of the molten portion 22 leads to transfer of heat of the molten portion 22 to the filler wire 19, thereby cooling the molten portion 22.

Figure 10:
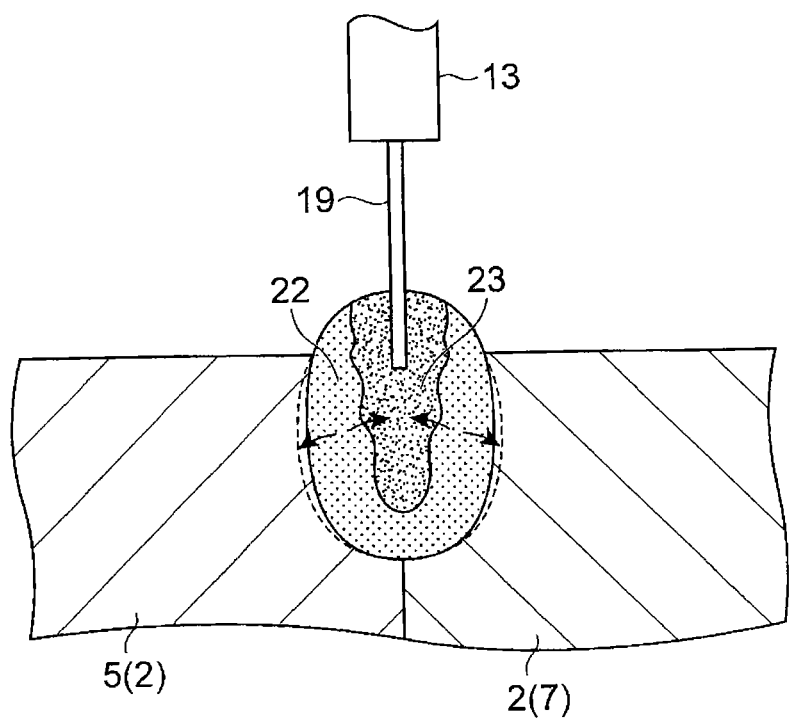
FIG. 10 is a drawing showing a state in which cold tandem welding is carried out along a narrow groove.

Now, the following will describe the state in the arc welding operation of arc-welding the shaft portion 2 to the transfer-gear-box-side joint assembly 3 and to the differential-gear-box-side joint assembly 4 along the narrow grooves 8 by the cold tandem welding, with reference to FIGS. 9 and 10.

As shown in FIGS. 9 and 10, as the filler wire 19 is supplied to the swelling portion 22b of the molten portion 22, a low-temperature molten portion 23 resulting from melting of the filler wire 19 is formed in the central part of the molten portion 22 and thus a contraction range of the molten portion 22 becomes narrower than in the case of ordinary arc welding without supply of the filler wire 19 to the molten portion 22. For this reason, contraction of the molten portion 22 becomes remarkably smaller in the cooling and hardening process of the molten portion 22 than in the case of ordinary arc welding. In addition, heat is taken for melting the cold filler wire 19, in the molten portion 22, and thus an amount of heat input from the molten portion 22 to the shaft portion 2, the transfer-gear-box-side joint assembly 3, and the differential-gear-box-side joint assembly 4 is kept remarkably smaller than in the case of ordinary arc welding. For this reason, influence of heat strain (thermal contraction) is remarkably suppressed for the transfer-gear-box-side joint assembly 3 and the differential-gear-box-side joint assembly 4 forming the free joints.

In the balance adjusting step of step S6, the rotation balance of the propeller shaft 1 is adjusted.

The below will describe a manufacturing method of a comparative example wherein the transfer-gear-box-side joint assembly 3 and the differential-gear-box-side joint assembly 4 not assembled yet are pressed into the shaft portion 2, with reference to FIG. 11.

Figure 11:
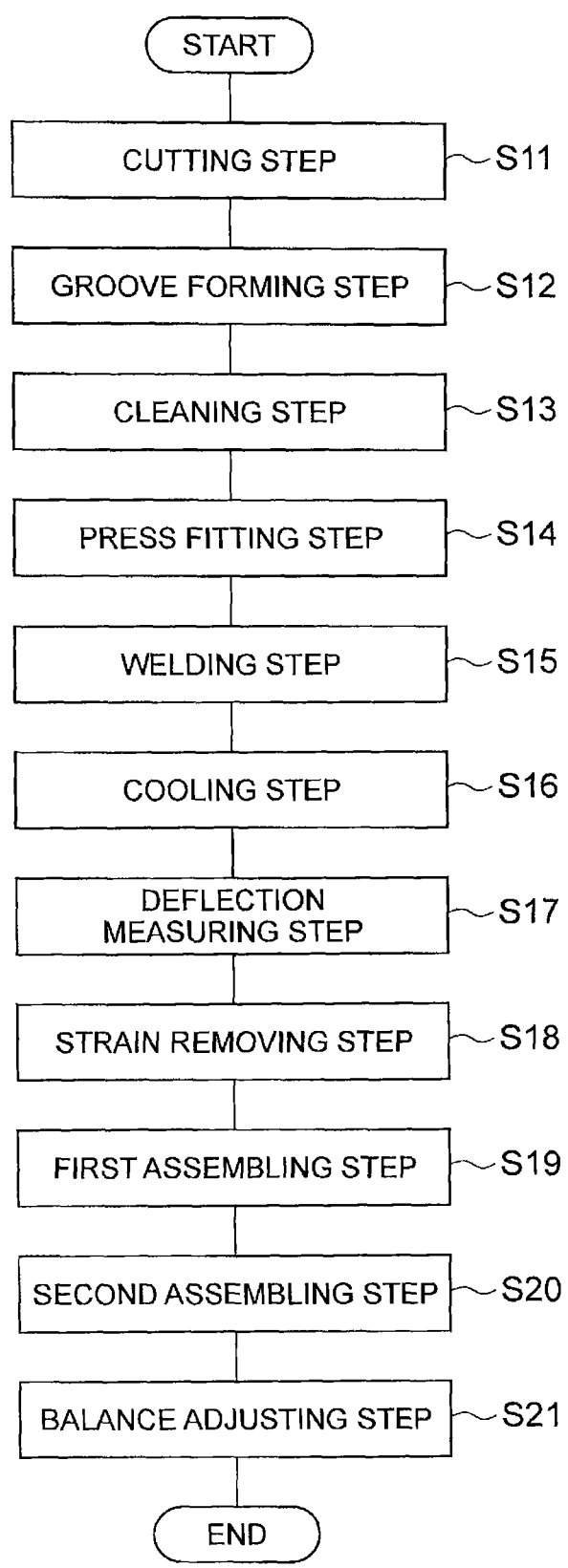
FIG. 11 is a flowchart showing a manufacturing method of a comparative example.

As shown in FIG. 11, the manufacturing method of the comparative example includes a cutting step (step S11), a groove forming step (step S12), a cleaning step (step S13), a press fitting step (step S14), a welding step (step S15), a cooling step (step S16), a deflection measuring step (step S17), a strain removing step (step S18), a first assembling step (step S19), a second assembling step (step S20), and a balance adjusting step (step S21), which are carried out in this order.

Specifically, a steel tube is cut to form the shaft portion 2 (step S11), grooves are formed at both ends of the shaft portion 2 (step S12), and the shaft portion 2 is cleaned (step S13). Next, the shaft-side joint 5a and the extension tube 6a are pressed into both ends of the shaft portion 2 (step S14), the shaft portion 2 is welded to the shaft-side joint 5a and to the extension tube 6a by full-circled welding (step S15), and the welded portions are cooled (step S16). Next, deflections of the shaft-side joint 5a and the extension tube 6a relative to the shaft portion 2 are measured (step S17), and strain is removed from the shaft-side joint 5a and the extension tube 6a relative to the shaft portion 2 (step S18). Then, the shaft-side joint 6b is attached through the coupling member 6d to the extension tube 6a (step S19), and the other-member-side joint 5b is attached through the coupling member 5c to the shaft-side joint 5a and the other-member-side joint 6c is attached through the coupling member 6e to the shaft-side joint 6b (step S20). Thereafter, the rotation balance of the propeller shaft 1 is adjusted (step S21).

As described above, the manufacturing method of the comparative example is a method of pressing the transfer-gear-box-side joint assembly 3 and the differential-gear-box-side joint assembly 4 not assembled yet, into the shaft portion 2, which requires a larger number of man-hours.

In contrast to it, the present embodiment is the method of pressing the transfer-gear-box-side joint assembly 3 and the differential-gear-box-side joint assembly 4 after assembled, into the shaft portion 2, whereby the attachment of the transfer-gear-box-side joint assembly 3 and the differential-gear-box-side joint assembly 4 to the shaft portion 2 can be implemented in one step, thereby reducing the number of man-hours.

Since the following wire without application of current is not heated, when the following wire without application of current is supplied to the molten portion before hardening, the molten portion can be cooled by the cold following wire. Namely, when the full-circled welding of the transfer-gear-box-side joint assembly 3 and the differential-gear-box-side joint assembly 4 to the shaft portion 2 is carried out by the cold tandem welding, the molten portion 22 can be cooled by the cold filler wire 19. As a result, the amount of heat input can be kept small to the shaft portion 2, the transfer-gear-box-side joint assembly 3, and the differential-gear-box-side joint assembly 4. This can remarkably suppress the influence of heat strain (thermal contraction) on the free joint mechanisms of the transfer-gear-box-side joint assembly 3 and the differential-gear-box-side joint assembly 4 even if the shaft portion 2 is welded to the shaft-side joint 5a of the transfer-gear-box-side joint assembly 3 and to the extension tube 6a of the differential-gear-box-side joint assembly 4 after the transfer-gear-box-side joint assembly 3 and the differential-gear-box-side joint assembly 4 have been assembled. For this reason, it is feasible to maintain the functions of the transfer-gear-box-side joint assembly 3 and the differential-gear-box-side joint assembly 4. Since the thermal contraction range of the molten portion 22 becomes smaller, it is feasible to remarkably reduce the thermal contraction in the cooling and hardening process of the molten portion 22. This can remarkably suppress the deflections of the transfer-gear-box-side joint assembly 3 and the differential-gear-box-side joint assembly 4 from the shaft portion 2. In addition, as the filler wire 19 is supplied to the molten portion 22, the molten portion 22 is replenished with the molten metal, which can form good excess weld metal 9 and excess weld metal 10 and which can suppress occurrence of welding failure such as humping.

When the filler wire 19 is supplied to the swelling portion 22b of the molten portion 22 in the rear part in the travel direction of the arc, it is possible to prevent the filler wire 19 from being directly heated by the arc. This can enhance the cooling effect of the molten portion 22 and allows the filler wire 19 to be supplied before cooling and hardening of the molten portion 22, which can suppress incomplete formation of the excess weld metal 9 and excess weld metal 10.

Since the grooves are the narrow grooves 8 and thus the groove width of the grooves becomes smaller than in the case of the grooves being Y-grooves, the heat strain (thermal contraction) of the excess weld metal 9 and excess weld metal 10 can be reduced and the amount of heat input is kept small to the shaft portion 2, the transfer-gear-box-side joint assembly 3, and the differential-gear-box-side joint assembly 4. This can further suppress the influence of heat strain (thermal contraction) on the free joint mechanisms of the transfer-gear-box-side joint assembly 3 and the differential-gear-box-side joint assembly 4 and further suppress the deflections of the transfer-gear-box-side joint assembly 3 and the differential-gear-box-side joint assembly 4 from the shaft portion 2. In addition, since the narrow grooves 8 are formed in the nearly U-shaped cross section with the opposed faces being nearly parallel, it is feasible to further suppress variation in positional relationship of the shaft portion 2 with the transfer-gear-box-side joint assembly 3 and the differential-gear-box-side joint assembly 4.

The preferred embodiment of the present invention was described above, but it should be noted that the present invention is by no means limited to the above embodiment.

For example, the above embodiment showed that the cold tandem welding was adopted as technique of arc welding, but other techniques may be employed.

The above embodiment showed that the grooves were the narrow grooves, but the grooves may be of other shapes.

REFERENCE SIGNS LIST 1 propeller shaft; 2 shaft portion; 2a shaft portion opposed face; 2b shaft portion opposed face; 3 transfer-gear-box-side joint assembly (joint assembly); 3a transfer-gear-box-side joint assembly opposed face; 4 differential-gear-box-side joint assembly (joint assembly); 4a differential-gear-box-side joint assembly opposed face; 5a shaft-side joint; 5b other-member-side joint; 5c coupling member; 6a extension tube (shaft-side joint); 6b shaft-side joint; 6c other-member-side joint; 6d coupling member; 6e coupling member; 7 reduced-diameter portions; 8 narrow grooves; 9 excess weld metal; 10 excess weld metal; 11 welding device; 12 arc welding torch; 13 filler wire supply device; 14 coupling member; 15 first wire feed device; 16 welding wire; 17 power supply device; 18 second wire feed device; 19 filler wire (following wire); 21 arc; 22 molten portion; 22a bottom; 22b swelling portion; 23 molten portion.

The invention claimed is:

1. A method for manufacturing a propeller shaft comprising a shaft portion of a circular tube shape and a joint assembly to be joined to a transfer gear box side or a differential gear box side of the shaft portion, the joint assembly comprising a shaft-side joint to be joined to the shaft portion and an other-member-side joint to be coupled to a transfer gear box or to a differential gear box, the method comprising:
   forming a groove by forming a reduced-diameter portion at least at one end of the shaft portion;
   press fitting the shaft-side joint of the joint assembly into the shaft portion, in a state in which the shaft-side joint and the other-member-side joint have been assembled into the joint assembly;
   welding the shaft portion and the joint assembly, after the press fitting; and
   forming a molten portion in the groove by arc generated with application of current to an electrode, and
   supplying a following wire without application of current, to the molten portion, before the molten portion hardens,
   wherein the groove has a U-shaped cross section defined by two side walls and a bottom of the groove, the bottom of the groove formed by the reduced-diameter portion, one of the two side walls being a face of the shaft portion, and the other of the two side walls being a face of the shaft-side joint which is opposed to and parallel with the face of the shaft portion, and
   wherein a width of the groove and a length of the reduced-diameter portion in an axial direction of the shaft portion are similar in size.

2. The method for manufacturing a propeller shaft according to claim 1, wherein the following wire is supplied to a swelling portion of the molten portion in a rear part in a travel direction of the arc.

3. The method for manufacturing a propeller shaft according to claim 1, wherein the side walls extend radially with respect to a longitudinal axis of the shaft portion.

4. A method for manufacturing a propeller shaft comprising a shaft portion of a circular tube shape and a joint assembly to be joined to a transfer gear box side or a joint assembly to be jointed to a differential gear box side of the shaft portion, the joint assembly comprising a shaft-side joint to be joined to the shaft portion and an other-member-side joint to be coupled to a transfer gear box or to a differential gear box, the method comprising:
   assembling the shaft-side joint and the other-member-side joint into the joint assembly;
   forming a groove by forming a reduced-diameter portion at least at one end of the shaft portion;
   press fitting the shaft-side joint of the joint assembly into the shaft portion after the assembling; and
   welding the shaft portion and the joint assembly after the press fitting,
   wherein the groove has a U-shaped cross section defined by two side walls and a bottom of the groove, the bottom of the groove formed by the reduced-diameter portion, one of the side walls being a face of the shaft portion, and the other of the side walls being a face of the shaft-side joint which is opposed to and parallel with the face of the shaft portion, and
   wherein a width of the groove and a length of the reduced-diameter portion in an axial direction of the shaft portion are similar in size.

5. The method for manufacturing a propeller shaft according to claim 4, wherein the welding comprises:
   forming a molten portion in the groove by arc generated with application of current to an electrode, and
   supplying a following wire without application of current, to the molten portion, before the molten portion hardens.

6. The method for manufacturing a propeller shaft according to claim 5, wherein the following wire is supplied to a swelling portion of the molten portion in a rear part in a travel direction of the arc.

7. The method for manufacturing a propeller shaft according to claim 4, wherein the side walls extend radially with respect to a longitudinal axis of the shaft portion.

8. A method for manufacturing a propeller shaft comprising a shaft portion of a circular tube shape and a joint assembly to be joined to a transfer gear box side or a differential gear box side of the shaft portion, the joint assembly comprising a shaft-side joint to be joined to the shaft portion and an other-member-side joint to be coupled to a transfer gear box or to a differential gear box, the method comprising:
   forming a groove by forming a reduced-diameter portion at least at one end of the shaft portion;
   press fitting the shaft-side joint of the joint assembly into the shaft portion, in a state in which the shaft-side joint and the other-member-side joint have been assembled into the joint assembly;
   welding the shaft portion and the joint assembly, after the press fitting; and
   forming a molten portion in the groove by arc generated with application of current to an electrode, and
   supplying a following wire without application of current, to the molten portion, before the molten portion hardens,
   wherein the groove has a U-shaped cross section defined by two side walls and a bottom of the groove, the bottom of the groove formed by the reduced-diameter portion, one of the two side walls being a face of the shaft portion, and the other of the two side walls being a face of the shaft-side joint which is opposed to and parallel with the face of the shaft portion.

9. The method for manufacturing a propeller shaft according to claim 8, wherein the side walls extend radially with respect to a longitudinal axis of the shaft portion.

* * * * *